United States Patent
Tolentino

(10) Patent No.: US 12,296,957 B2
(45) Date of Patent: May 13, 2025

(54) SYSTEM AND METHOD FOR LAUNCHING A PAYLOAD FROM AN AIRCRAFT

(71) Applicant: The Boeing Company, Arlington, VA (US)

(72) Inventor: Norman Allen Tolentino, Westminster, CA (US)

(73) Assignee: The Boeing Company, Arlington, VA (US)

( * ) Notice: Subject to any disclaimer, the term of this patent is extended or adjusted under 35 U.S.C. 154(b) by 49 days.

(21) Appl. No.: 18/333,064

(22) Filed: Jun. 12, 2023

(65) Prior Publication Data

US 2024/0409211 A1 Dec. 12, 2024

(51) Int. Cl.
*B64D 1/02* (2006.01)
(52) U.S. Cl.
CPC ...................... *B64D 1/02* (2013.01)
(58) Field of Classification Search
CPC .... B64D 1/02; B64D 1/16; B64D 1/12; F41F 7/00; F41F 3/007; F41H 11/02
See application file for complete search history.

(56) References Cited

U.S. PATENT DOCUMENTS

| | | | | |
|---|---|---|---|---|
| 1,211,738 A | * | 1/1917 | Marty | A63B 69/406 124/78 |
| 2,258,281 A | * | 10/1941 | Dunajeff | F42B 12/58 244/3.21 |
| 2,395,547 A | * | 2/1946 | Hojnowski | B64D 1/04 89/1.51 |
| 2,585,030 A | * | 2/1952 | Nosker | B64D 1/04 89/1.51 |
| 3,371,891 A | * | 3/1968 | Brader, Sr. | B64D 9/00 89/1.51 |
| 3,459,099 A | * | 8/1969 | Litz, Jr. | B64D 1/02 89/1.51 |
| 3,511,457 A | * | 5/1970 | Pogue | B64D 1/02 89/1.51 |
| 3,517,584 A | * | 6/1970 | Robinson | B64D 1/02 89/1.51 |

(Continued)

FOREIGN PATENT DOCUMENTS

KR 20180030688 A 3/2018

*Primary Examiner* — Medhat Badawi
(74) *Attorney, Agent, or Firm* — Hanley, Flight & Zimmerman, LLC

(57) ABSTRACT

A system for launching a payload from an aircraft includes a magazine and a conveying mechanism. The magazine has a payload chamber at a first end of the magazine for retaining the payload and an exit port through which the payload may be launched, with the magazine configured to be disposed at or below an outer skin surface of the aircraft. The conveying mechanism includes a rotatable conveying member for contacting an outer surface of the payload when the payload is loaded into the payload chamber and for selectably rotating so as to cause the payload to be launched out of the magazine through the exit port. The system may optionally include a pivoting mechanism for pivoting the magazine between a stowed orientation and a deployed orientation, wherein the first end extends outside the outer skin surface in the deployed orientation.

20 Claims, 12 Drawing Sheets

(56) References Cited

U.S. PATENT DOCUMENTS

| | | | | |
|---|---|---|---|---|
| 3,547,000 A * | 12/1970 | Haberkorn | ............... | F42B 5/035 89/1.51 |
| 3,808,940 A * | 5/1974 | Schillreff | ............... | F41F 3/042 89/1.51 |
| 4,134,115 A * | 1/1979 | Strom | ............... | F42B 12/70 221/88 |
| 4,161,301 A * | 7/1979 | Beardsley | ............... | B64D 1/10 89/1.51 |
| 4,256,012 A * | 3/1981 | Cowart | ............... | B64D 1/08 89/1.51 |
| 4,349,168 A * | 9/1982 | Barnes | ............... | B64D 1/10 410/105 |
| 4,421,007 A * | 12/1983 | Hanes, Jr. | ............... | F41G 9/02 89/1.11 |
| 4,522,104 A * | 6/1985 | Degen | ............... | B64D 1/06 89/1.51 |
| 4,524,670 A * | 6/1985 | Billard | ............... | F42B 5/15 89/1.51 |
| 4,679,483 A * | 7/1987 | Wrana | ............... | B64D 1/16 89/1.51 |
| 4,923,148 A * | 5/1990 | Fillingham | ............... | B64D 1/08 89/1.51 |
| 5,090,642 A * | 2/1992 | Salkeld | ............... | B64C 3/14 244/171.3 |
| 5,103,712 A * | 4/1992 | Minovitch | ............... | B64D 1/00 198/804 |
| 5,136,951 A * | 8/1992 | Herrlinger | ............... | B64C 7/00 102/513 |
| 5,271,523 A * | 12/1993 | Nasvall | ............... | B64D 1/02 221/199 |
| 5,381,721 A * | 1/1995 | Holmstrom | ............... | F41H 11/02 89/1.51 |
| 5,413,024 A * | 5/1995 | Plummer | ............... | F41F 3/065 89/1.816 |
| 6,050,527 A * | 4/2000 | Hebert | ............... | B64C 23/00 244/209 |
| 6,347,567 B1 * | 2/2002 | Eckstein | ............... | F42B 39/26 89/1.801 |
| 6,619,178 B1 * | 9/2003 | Fransson | ............... | B64D 1/02 89/1.51 |
| 6,666,351 B1 * | 12/2003 | Hartz | ............... | F41H 11/02 102/342 |
| 7,597,038 B2 * | 10/2009 | Travis | ............... | F41F 7/00 89/1.804 |
| 7,600,477 B2 * | 10/2009 | Zatterqvist | ............... | F41F 3/065 89/1.816 |
| 7,614,334 B2 * | 11/2009 | Bellino | ............... | F41H 11/02 89/1.51 |
| 7,866,246 B2 * | 1/2011 | Bellino | ............... | F41H 11/02 89/1.51 |
| 8,297,165 B2 * | 10/2012 | Travis | ............... | B64D 1/02 89/1.804 |
| 8,485,467 B2 * | 7/2013 | Gemma | ............... | F42B 12/48 244/121 |
| 8,490,924 B2 * | 7/2013 | Zachrisson | ............... | F41F 7/00 89/1.51 |
| 8,549,976 B2 * | 10/2013 | Zatterqvist | ............... | B64D 7/00 89/1.51 |
| 8,607,682 B2 * | 12/2013 | Zatterqvist | ............... | F41J 2/02 89/1.51 |
| 8,720,829 B2 * | 5/2014 | Zatterqvist | ............... | B64D 7/00 89/1.51 |
| 9,523,560 B2 * | 12/2016 | Rafin | ............... | F41H 11/02 |
| 9,795,812 B2 * | 10/2017 | Charlton | ............... | F42B 12/50 |
| 10,330,449 B2 * | 6/2019 | Fix | ............... | F42B 12/70 |
| 10,486,813 B2 * | 11/2019 | Zaetterqvist | ............... | F41F 3/077 |
| 10,543,905 B1 * | 1/2020 | Kwon | ............... | B64C 17/02 |
| 10,696,401 B2 * | 6/2020 | Zaetterqvist | ............... | B64D 1/02 |
| 10,871,348 B2 * | 12/2020 | Zätterqvist | ............... | B64D 1/02 |
| 10,994,842 B1 * | 5/2021 | Skylus | ............... | B64C 37/02 |
| 11,053,007 B1 * | 7/2021 | Mills | ............... | F42B 4/26 |
| 11,143,481 B2 * | 10/2021 | Bies | ............... | B64D 1/04 |
| 11,685,526 B2 * | 6/2023 | Zatterqvist | ............... | B64D 7/04 89/1.59 |
| 11,919,641 B2 * | 3/2024 | Bystroem | ............... | F41H 11/02 |
| 11,999,483 B2 * | 6/2024 | Bystroem | ............... | F41F 7/00 |
| 2007/0068373 A1 * | 3/2007 | McCantas Jr. | ............... | F41F 3/06 89/1.11 |
| 2008/0121098 A1 * | 5/2008 | Gaigler | ............... | F41H 11/02 102/501 |
| 2009/0084253 A1 * | 4/2009 | Bellino | ............... | F41H 11/02 89/1.51 |
| 2009/0120955 A1 * | 5/2009 | Friede | ............... | F41F 7/00 221/282 |
| 2011/0084162 A1 * | 4/2011 | Goossen | ............... | B64U 70/80 244/135 C |
| 2012/0012605 A1 * | 1/2012 | Melin | ............... | F41H 11/02 221/87 |
| 2012/0012608 A1 * | 1/2012 | Sjobeck | ............... | B64D 1/02 221/246 |
| 2012/0104174 A1 * | 5/2012 | Zatterqvist | ............... | F41J 2/02 221/133 |
| 2012/0125183 A1 * | 5/2012 | Zatterqvist | ............... | F42B 12/70 89/1.51 |
| 2019/0092469 A1 * | 3/2019 | Zaetterqvist | ............... | F42B 5/15 |
| 2019/0193857 A1 * | 6/2019 | Zätterqvist | ............... | B64D 7/00 |
| 2019/0283878 A1 * | 9/2019 | Zaetterqvist | ............... | B64D 1/02 |
| 2020/0158467 A1 * | 5/2020 | Zätterqvist | ............... | F41F 7/00 |
| 2020/0363155 A1 * | 11/2020 | Bies | ............... | B64D 7/08 |
| 2021/0261254 A1 * | 8/2021 | Bystroem | ............... | B64D 1/02 |
| 2021/0316860 A1 * | 10/2021 | Bystroem | ............... | B64D 1/02 |
| 2022/0212775 A1 * | 7/2022 | Tao | ............... | B64C 29/0033 |
| 2022/0234735 A1 * | 7/2022 | Zatterqvist | ............... | B64D 1/02 |
| 2023/0322384 A1 * | 10/2023 | Hamelin | ............... | B64F 5/60 89/1.51 |

* cited by examiner

SYSTEM AND METHOD FOR LAUNCHING A PAYLOAD FROM AN AIRCRAFT

INTRODUCTION

This disclosure relates generally to systems and methods for launching a payload from an aircraft.

In some aircraft, there may be a need to launch one or more payloads from the aircraft while in flight. Conventional systems designed for this purpose typically launch the payloads in a vertical direction (i.e., generally perpendicular to the aircraft's line of flight), and utilize mechanisms involving pistons, hydraulics and the like for launching or ejecting the payloads, typically at an exit speed that is far less than the air speed of the aircraft, especially for high-speed aircraft. This type of approach can lead to unintended consequences, such as the payload bouncing off the shock wave that is created around the aircraft during flight, which can possibly cause the payload to slam back into the aircraft after ejection.

SUMMARY

According to one embodiment, a system for launching a payload from an aircraft includes a magazine and a conveying mechanism. The magazine has opposed first and second ends, a longitudinal magazine axis extending between the first and second ends, a payload chamber proximate the first end for retaining the payload therein, and an exit port at the first end through which the payload may exit the magazine, wherein the magazine is configured to be disposed at or below an outer skin surface of the aircraft. The conveying mechanism is operatively associated with the magazine and includes a rotatable conveying member configured for contacting an outer surface of the payload when the payload is loaded into the payload chamber and for selectably rotating at a predetermined rate so as to cause the payload to be launched out of the magazine through the exit port.

The system may also include a pivoting mechanism connected with the magazine and configured for connection with the aircraft. The pivoting mechanism may be configured for pivoting the magazine about the second end between a stowed orientation, in which the first end is disposed at or below an outer skin surface of the aircraft, and a deployed orientation, in which the first end extends outside the outer skin surface and the second end remains at or below the outer skin surface with the longitudinal magazine axis forming an angle of inclination with respect to a longitudinal axis of the aircraft. In this arrangement, the angle of inclination may be less than 20 degrees, and optionally the angle of inclination may be greater than or equal to 10 degrees and less than or equal to 12 degrees.

The magazine may have a generally tubular shape, and the payload may have a straight extrusion-like overall shape. Optionally, the magazine may include one or more guiding members therein for supporting the payload when the payload is loaded into the payload chamber.

The rotatable conveying member may be configured as a wheel, a generally cylindrical roller, a spool or a continuous belt, and it may have an outer traction surface made of an elastomeric material. In some configurations, the rotatable conveying member may include at least two rotatable conveying members disposed about a cross-sectional perimeter of the payload chamber.

The conveying mechanism may include a biasing member configured to bias the rotatable conveying member against the outer surface of the payload when the payload is loaded into the payload chamber. Additionally, the conveying mechanism may be located proximate the first end of the magazine. In some arrangements, the conveying mechanism may be further configured for rotating the rotatable conveying member with the rotatable conveying member disengaged from the outer surface of the payload, and for engaging the rotatable conveying member with the outer surface of the payload while the rotatable conveying member is rotating.

The magazine may be configured for retaining an additional payload therein. In this configuration, the magazine may include an advancing mechanism for advancing the additional payload from a standby position, in which the additional payload is located outside the payload chamber, to a ready position, in which the additional payload is loaded into the payload chamber.

The predetermined rate of rotation of the rotatable conveying member may be a predetermined rotational speed and/or a predetermined torque.

According to another embodiment, a system for launching a payload from an aircraft in an aftward direction during flight includes: (i) a generally tubular-shaped magazine having opposed first and second ends, a longitudinal magazine axis extending between the first and second ends, a payload chamber proximate the first end for retaining the payload therein, and an exit port at the first end through which the payload may exit the magazine; (ii) a pivoting mechanism connected with the magazine and configured for connection with the aircraft, wherein the pivoting mechanism is configured for pivoting the magazine about the second end between a stowed orientation, in which the first end is disposed at or below an outer skin surface of the aircraft, and a deployed orientation, in which the first end extends outside the outer skin surface and the second end remains at or below the outer skin surface with the longitudinal magazine axis forming an angle of inclination of less than 20 degrees with respect to a longitudinal axis of the aircraft; and (iii) a conveying mechanism connected with the magazine and including a rotatable conveying member configured for contacting an outer surface of the payload when the payload is loaded into the payload chamber and for selectably rotating about an axis of rotation at a predetermined rate when the magazine is in the deployed orientation so as to cause the payload to be launched out of the magazine through the exit port.

According to yet another embodiment, a method for launching a payload from an aircraft includes: (i) loading the payload into a payload chamber of a magazine, wherein the magazine has opposed first and second ends, a longitudinal magazine axis extending between the first and second ends, the payload chamber located proximate the first end, and an exit port at the first end through which the payload may exit the magazine, wherein the magazine is configured to be disposed at or below an outer skin surface of the aircraft; and (ii) rotating a rotatable conveying member at a predetermined rate with the rotatable conveying member being in contact with an outer surface of the payload so as to cause the payload to be launched out of the magazine through the exit port.

The method may also include pivoting the magazine from a stowed orientation, in which the first end is disposed at or below an outer skin surface of the aircraft, to a deployed orientation, in which the first end extends outside the outer skin surface and the second end remains at or below the outer skin surface. Additionally, the magazine may be configured for retaining an additional payload therein, and the method may further include advancing the additional payload from a standby position, in which the additional payload is located outside the payload chamber, to a ready position, in which the additional payload is loaded into the payload chamber.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
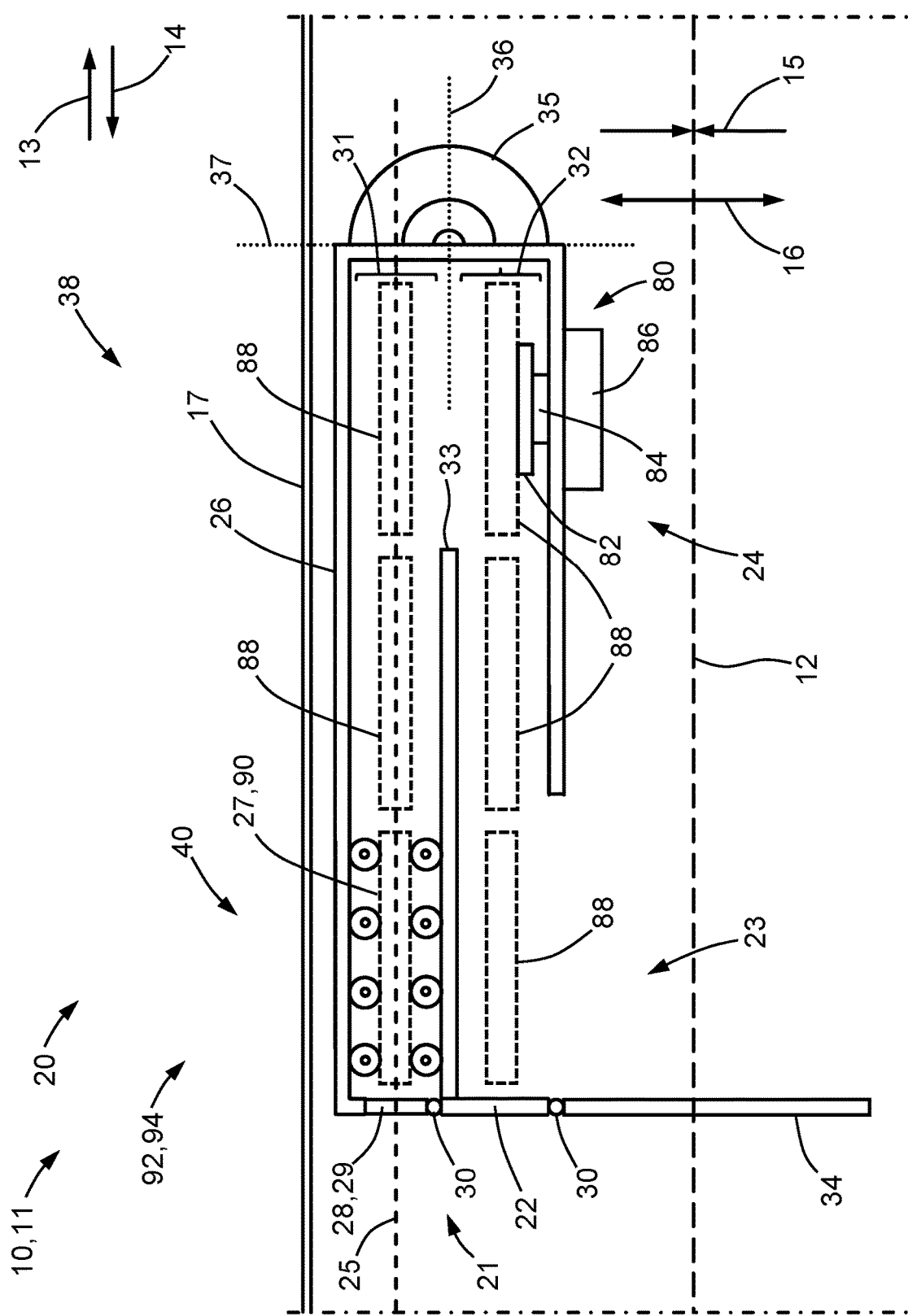
FIG. 1 is a schematic, cross-sectional side view of a portion of an aircraft carrying a system for launching a payload according to the present disclosure, shown in a stowed orientation in preparation for loading.

Referring now to the drawings, wherein like numerals indicate like parts in the several views, a system 20 for launching or ejecting a payload 19 from an aircraft 10, and a method 100 for launching or ejecting a payload 19 from an aircraft 10, are shown and described herein.

Conventional launching systems carried onboard an aircraft 10 typically include a launch tube disposed within the interior of the aircraft 10 and its airframe 11, with the launch tube having an interior bore therein which defines a launch axis. The launch tube is sized and shaped so as to accommodate a payload 19 therewithin, and the launch tube is oriented such that the launch axis points outward in a direction that is perpendicular to a longitudinal axis 12 of the aircraft/airframe 10, 11. The interior bore communicates with an expansion chamber which is situated at an inward end of the launch tube, and the expansion chamber also communicates with a propulsion generator. The propulsion generator provides a sudden burst of pressure to the expansion chamber, such as by a rapid release of steam, air or hydraulic pressure, or by a controlled combustion or the like. Alternatively or additionally, a ram may be disposed between the payload 19 and the expansion chamber, such that the sudden burst of pressure acts on the ram, and the ram in turn exerts a sudden burst of pressure or lift on the payload 19.

However, conventional approaches such as described above may suffer from various drawbacks. For example, the high pressures involved in such systems typically require relatively thick, strong launch tubes, which adds to the overall cost and weight of the system. These high pressures also require the use of various high-pressure fittings and couplings, which also add to the cost and complexity and represent potential failure points due to leaks that may develop. Also, as mentioned above, with conventional approaches there is the possibility that the ejected payload 19 may bounce off the shock wave surrounding the aircraft 10, thus possibly causing damage to the aircraft 10.

In contrast with the foregoing conventional approach, the system 20 and method 100 of the present disclosure solve the technical problems associated with the generation, containment and sudden release of high-pressure, by the technical effect of utilizing a different propulsion approach, thereby providing significant benefits and technical advantages which are not taught or suggested by the known conventional approaches. These benefits and technical advantages include the use of structural elements and features, and the execution of process steps, which offer less complexity, less cost, improved safety and higher reliability as compared to previous approaches.

Turning now to FIGS. 1-20, a system 20 and method 100 for launching a payload 19 from an aircraft 10 will now be described in detail.

Figure 2:
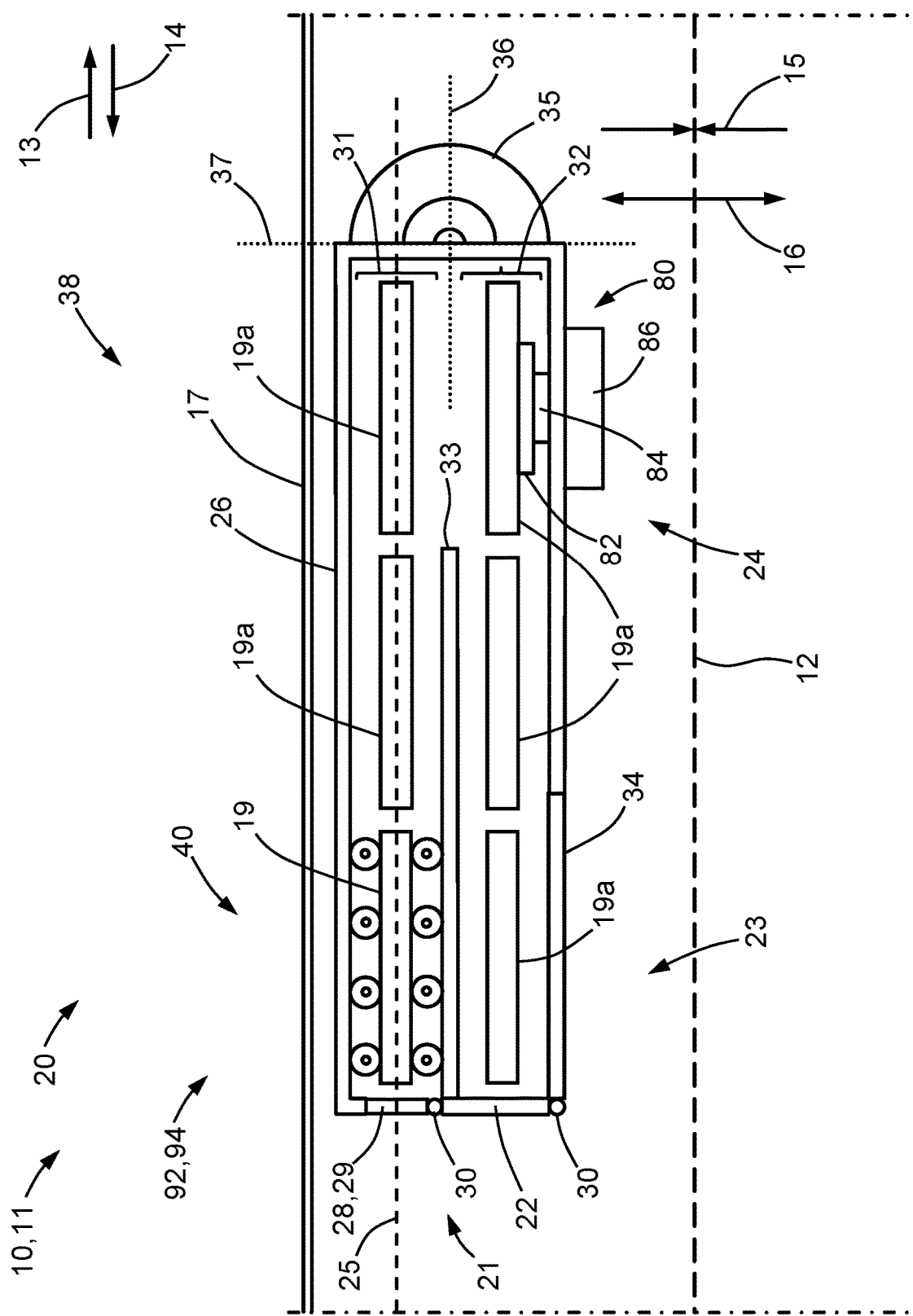
FIG. 2 is a schematic, cross-sectional side view of the system of FIG. 1, shown in a stowed and loaded orientation.
Figure 3:
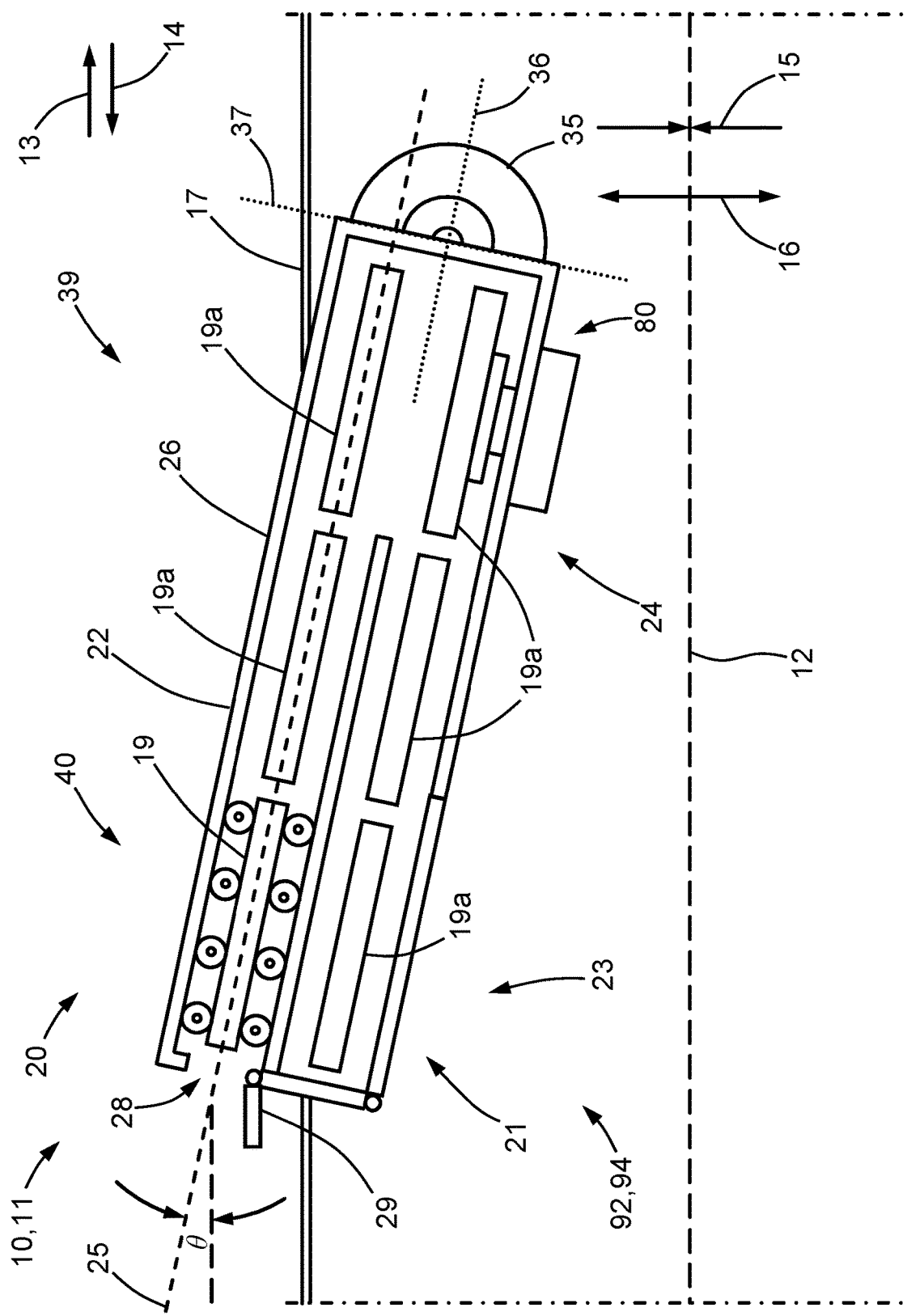
FIG. 3 is a schematic, cross-sectional side view of the system of FIGS. 1-2, shown in a deployed orientation.
Figure 4:
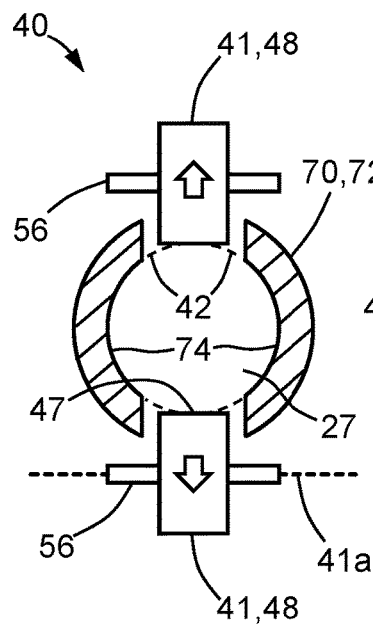
FIGS. 4-9 show schematic end views of a conveying mechanism of the present system according to various configurations.
Figure 5:
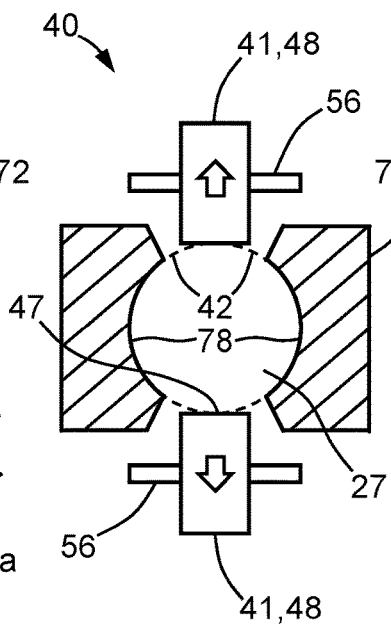
Figure 6:
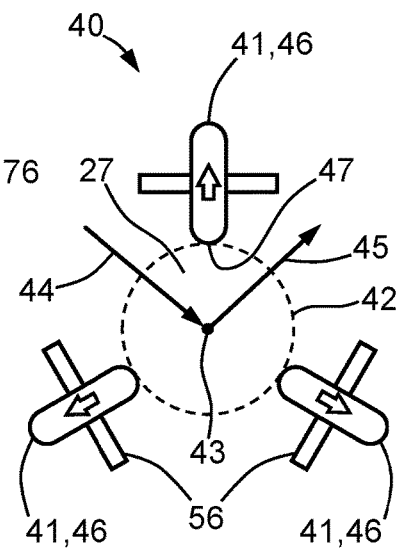
Figure 7:
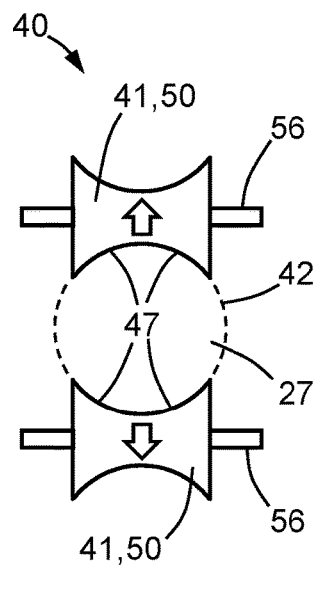

FIGS. 1-3 show schematic, cross-sectional side views of a portion of an aircraft 10 carrying a system 20 for launching a payload 19 according to the present disclosure. More specifically, FIG. 1 shows the system 20 in a stowed orientation 38 in preparation for loading payloads 19 therein, FIG. 2 shows the system 20 in the stowed orientation 38 with multiple payloads 19 loaded, and FIG. 3 shows the system 20 in a deployed orientation 39 so that the payloads 19 may be launched from the aircraft 10.

As shown in the drawings, the system 20 includes a magazine 21 and a conveying mechanism 40. The magazine 21 has a main structure 22 with opposed first and second ends 23, 24, and a longitudinal magazine axis 25 extending between the first and second ends 23, 24. The magazine 21 also includes a top surface 26 which may be located at or below the outer skin surface 17, a payload chamber 27 located proximate the first end 23 for retaining a payload 19 therein, and an exit port 28 at the first end 23 through which the payload 19 may be launched from the magazine 21. In FIGS. 1 and 2, an exit port door 29 is shown in a closed position across the exit port 28, while in FIG. 3 the exit port door 29 is shown in an open position in which the exit port door 29 has been rotated about a rotating member 30 (such as a hinge) to expose or open the exit port 28. Note that in the stowed orientation 38 illustrated in FIGS. 1-2, the first end 23 is disposed at or below an outer skin surface 17 of the aircraft 10, while in the deployed orientation 39 illustrated in FIG. 3, the first end 23 extends outside the outer skin surface 17 and the second end 24 remains at or below the outer skin surface 17.

The magazine 21, and in particular the main structure 22 of the magazine 21, may have a generally tubular shape overall. This overall generally tubular shape may be dimensioned so as to accommodate the generally tubular shape 19t of the one or more payloads 19 that are loaded into the magazine 21. As shown in FIGS. 1-3, the magazine 21 may optionally include a first barrel 31 extending along the longitudinal magazine axis 25 and a second barrel 32 extending generally parallel and co-extensive with the first barrel 31, with the two barrels 31, 32 separated from each other by a dividing wall 33. Alternatively, the magazine 21 may include only a first barrel 31 (i.e., only a single barrel), or it may include three or more barrels.

In any of these barrel arrangements, each barrel 31, 32 may be sized so as to accommodate multiple payloads 19 therein. For example, in FIGS. 1-3, each of the two barrels 31, 32 is sized so as to accommodate three payloads 19, as indicated by the three dashed rectangles in each barrel 31, 32, for a total of six payloads. The two barrels 31, 32 are also arranged such that the first barrel 31 has a payload chamber 27 nearest to the exit port 28 which may be designated as a ready (or ready-to-launch) position 90, with two other positions which may be designated as standby positions 88. Correspondingly, the second barrel 32 is shown having three standby positions 88.

In the arrangement shown, a payload 19 may be loaded into the second barrel 32 through a loading door 34, which is pivotable about a rotating member or hinge 30 attached to the main structure 22 and which is shown in an open position in FIG. 1. Additional payloads may be loaded through the loading door 34 and advanced through the second barrel 32, then through a gap separating the two barrels 31, 32, and then into the first barrel 31. Further payloads 19 may be loaded until both barrels 31, 32 are filled, with one payload 19 situated in the singular ready position 90 and five additional payloads 19a situated in the five standby positions 88, as shown in FIG. 2, where the loading door 34 is shown in a closed position. Then, as illustrated in FIG. 3 and as explained in further detail below, the magazine 21 may be tilted or rotated about the magazine's second end 24, such that at least a portion of the first end 23, such as a portion of the first barrel 31, protrudes or extends outward of the outer skin surface 17. An optional door or cover (not shown) on the outer skin surface 17 may cover the magazine 21 when the system 20 is in the stowed orientation 38 illustrated in FIGS. 1-2, and the door or cover may be moved aside when the system 20 transitions into the deployed orientation 39 illustrated in FIG. 3.

As mentioned above, in addition to the magazine 21, the system 20 also includes a conveying mechanism 40. The conveying mechanism 40, which may be located proximate the first end 23 of the magazine 21, is operatively associated or connected with the magazine 21 (e.g., through mechanical connection therewith) and includes one or more rotatable conveying members 41. The rotatable conveying members 41 are configured and arranged for contacting an outer surface 19os of the payload 19 when the payload 19 is loaded into the payload chamber 27 (i.e., in the ready-to-launch position 90), and for selectably rotating at a predetermined rate 57 so as to cause the payload 19 to be launched out of the magazine 21 through the exit port 28 while the exit port door 29 is open.

In each set of rotatable conveying members 41, one or more of the members 41 may be driven, such as by an electric motors (not shown) operatively connected with the members 41. Additionally, one or more others of the rotatable conveying members 41 may be non-driven or freewheeling, without any electric motor operatively connected therewith. Note that the conveying mechanism 40 and rotatable conveying members 41 are shown in the drawings as only being present in the ready-to-launch position 90; however, this is simply for the sake of clarity, as the conveying mechanism 40 and rotatable conveying members 41 may also be present in each of the standby positions 88 as well.

Figure 8:
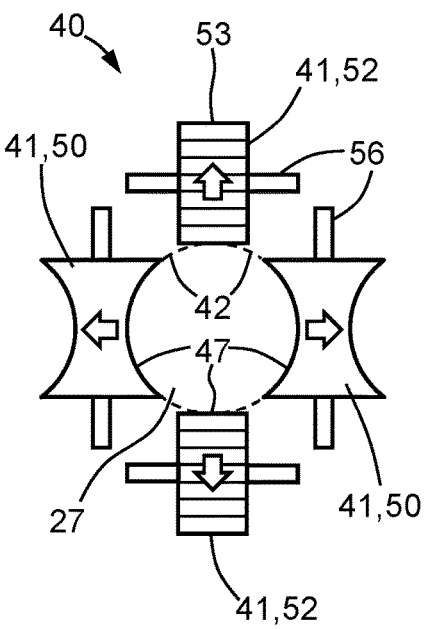
Figure 9:
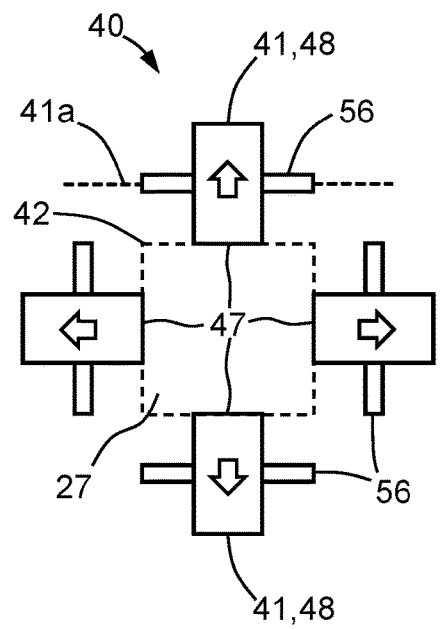

FIGS. 4-9 show schematic end views of various configurations of the conveying mechanism 40 and its rotatable conveying members 41. Each rotatable conveying member 41 may be configured as a generally cylindrical roller 48 (FIGS. 4-5 and 9), a wheel 46 (FIG. 6), a spool 50 (FIG. 7) or a continuous belt 52 (FIG. 8). In the form of a wheel 46, roller 48 or spool 50, the rotatable conveying member 41 may be rotatable about a shaft or hub 56 which rotates about an axis of rotation 41a; however, in the form of a continuous belt 52, the rotatable conveying member 41 may be rotatable about multiple shafts/hubs 56. Each rotatable conveying member 41 may have an outer traction surface 53 made of an elastomeric material 55 which provides a high friction coefficient 54, with the outer traction surface 53 being shaped and sized such that an inward surface 47 of the rotatable conveying member 41 makes contact with the outer surface 19os of a payload 19 once the payload 19 is loaded into the ready position 90.

Optionally, the conveying mechanism 40 or magazine 21 may include one or more guiding members 70 therein for supporting the payload 19 when the payload 19 is loaded into the payload chamber 27. As shown in the drawings, the guiding members 70 may be shaped or configured as a sheath or tube 72 (FIG. 4) or as a bearing block 76 (FIG. 5), with the inner surface 74 of the sheath/tube 72 or the inner surface 78 of the bearing block 76 forming or defining at least part of the payload chamber 27 and conforming in shape and profile to the cross-sectional perimeter 42 of the payload 19 and the payload chamber 27. It should be noted that rotatable conveying members 41 and guiding members 70 may also be used at each of the standby positions 88 as well.

In some configurations, the conveying mechanism 40 may include two or more rotatable conveying members 41 disposed about a cross-sectional perimeter 42 of the payload chamber 27. As shown in the drawings, the cross-sectional perimeter 42 of the payload chamber 27 may be generally circular (FIGS. 4-8), generally rectangular/square (FIG. 9), or another other suitable shape. As particularly illustrated in FIG. 6, the cross-sectional perimeter 42 may have a cross-sectional center 43 which defines a cross-sectional inward direction 44 (i.e., pointing toward the cross-sectional center 43) and a cross-sectional outward direction 45 (i.e., pointing away from the cross-sectional center 43).

Figure 13:
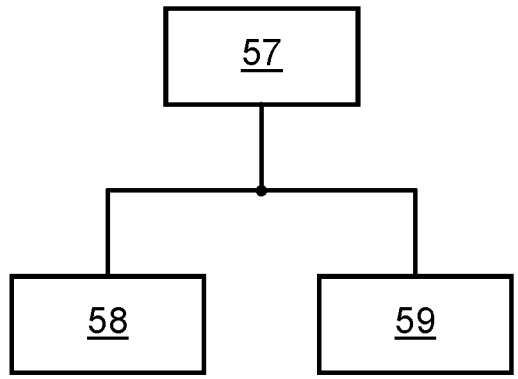
FIG. 13 is a block diagram illustrating characteristics of a predetermined rate of rotation for a rotatable conveying member.
Figure 14:
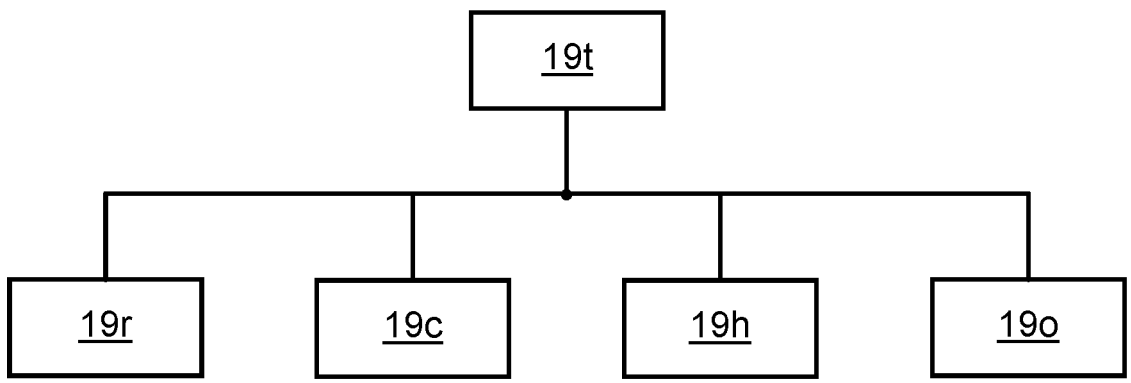
FIG. 14 is a block diagram illustrating various generally tubular shapes for a payload.

The cross-sectional perimeter 42 of the payload chamber 27 may be configured so as to substantially match the shape and size of the cross-sectional perimeter of the outer surface 19os of the payloads 19 that are to be loaded into the magazine 21. As shown in FIG. 14, the payloads 19 may have a generally tubular cross-sectional shape or profile 19t, such as a generally rectangular shape 19r, a generally circular shape 19c, a generally hexagonal shape 19h, or any other suitable shape 190. As illustrated in the schematic side view of FIG. 12 which shows a first end 23 portion of the system 20, the payload 19 may have a straight, extrusion-like overall shape 19s, with the rotatable conveying members 41 (shown here configured as cylindrical rollers 48 and continuous belts 52) being arranged and supported so as to make contact on their respective inward surfaces 47 with the payload 19 when the payload 19 is positioned in the payload chamber 27. (It should be noted, however, that the generally tubular shapes of the main structure 22 and the payload 19s, as shown in the drawings and described herein, are merely examples, as other shapes are also possible.) As shown in FIG. 13, the predetermined rate 57 of rotation of each rotatable conveying member 41 may be a predetermined rotational speed 58 and/or a predetermined torque 59, such as may be needed to cause the exit speed of the payload 19 to be faster than can be achieved using the abovementioned conventional approaches.

Figure 10:
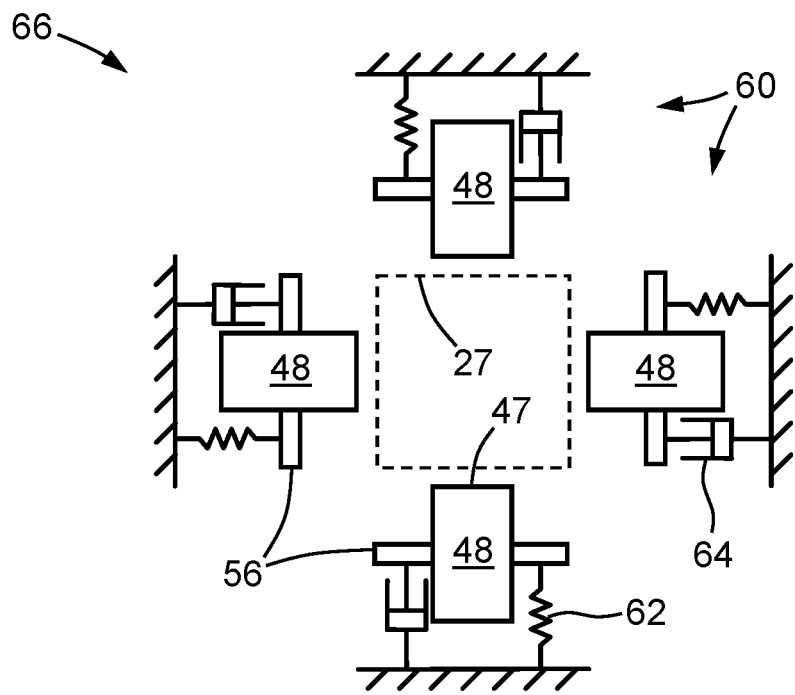
FIGS. 10-11 show schematic end views of a conveying mechanism which includes biasing members in disengaged and engaged arrangements, respectively.
Figure 11:
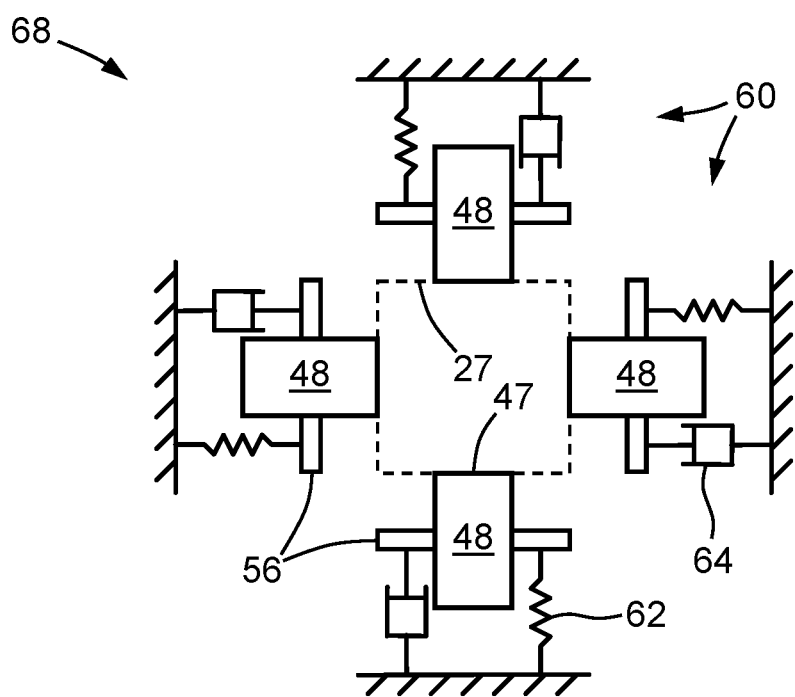
Figure 12:
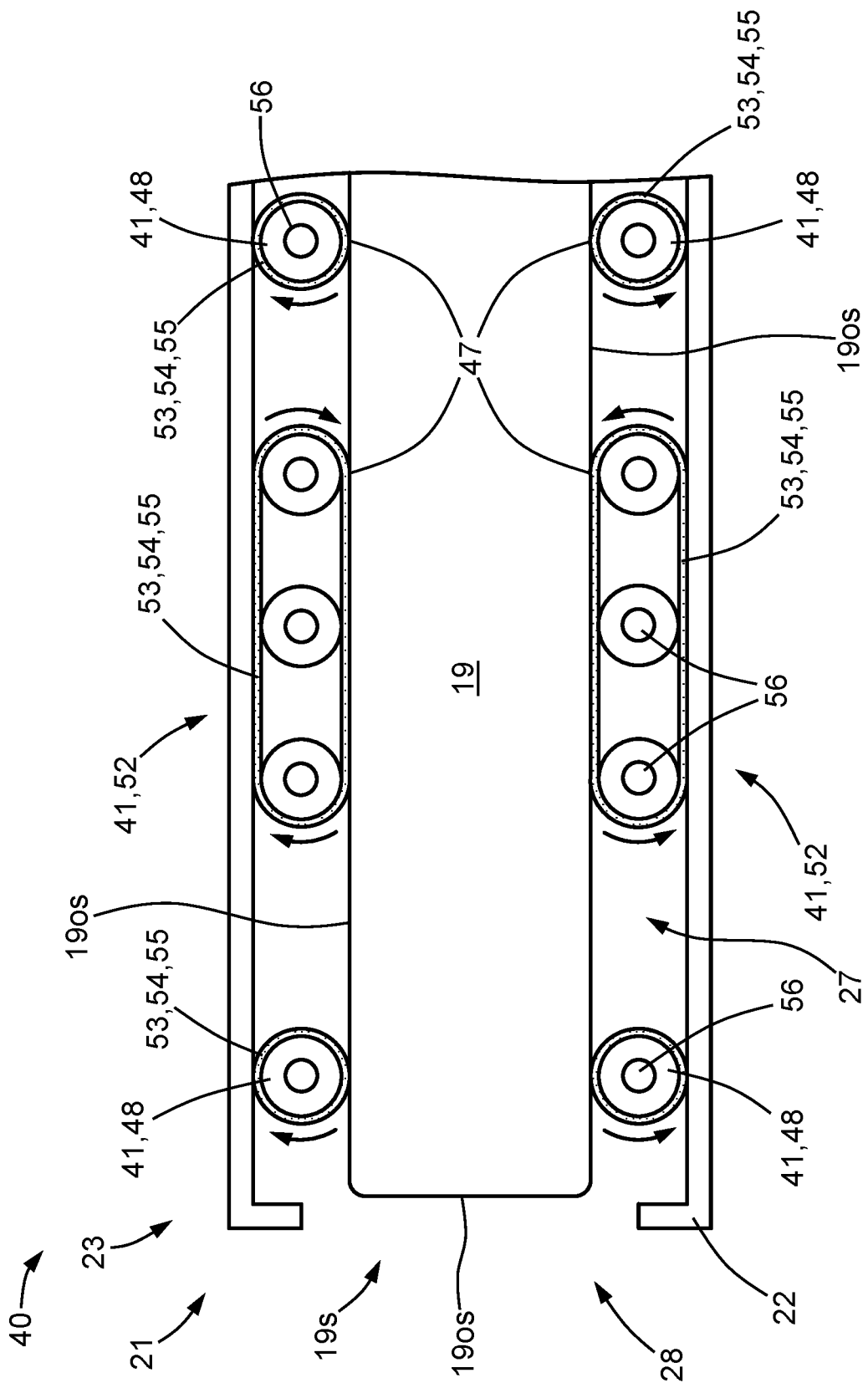
FIG. 12 is a schematic side view of a portion of a system in which the conveying mechanism includes rotatable conveying members configured as cylindrical rollers and continuous belts.

Turning now to FIGS. 10-11, the conveying mechanism 40 may also include one or more biasing members 60 configured to bias the rotatable conveying member 41 against the outer surface 19os of the payload 19 when the payload 19 is loaded into the payload chamber 27. Each biasing member 60 may include one or more springs 62 and more or more dampers 64, as illustrated schematically in FIGS. 10-11 in connection with rotatable conveying members 41 configured as cylindrical rollers 48.

In some configurations, the conveying mechanism 40 may be further configured for rotating the rotatable conveying member 41 with the rotatable conveying member 41 disengaged from the outer surface 19os of the payload 19, and for engaging the rotatable conveying member 41 with the outer surface 19os of the payload 19 while the rotatable conveying member 41 is rotating. For example, FIG. 10 shows the conveying mechanism 40 in a disengaged arrangement 66 with the rotatable conveying members 41 spaced apart or retracted (i.e., disengaged) from the perimeter of the payload chamber 27, while FIG. 11 shows the conveying mechanism 40 in an engaged arrangement 66 with the rotatable conveying members 41 in contact (i.e., engaged) with the perimeter of the payload chamber 27.

The provision of these two arrangements permits one or more of the rotatable conveying members 41 to be retracted away from the payload chamber 27 in the disengaged arrangement 66 so as to facilitate loading of a payload 19 into the payload chamber 27; then, after loading, the one or more retracted rotatable conveying members 41 may be extended so as to make contact with and support the loaded payload 19. Alternatively, biasing members 60 may be provided without the capability of retracting into a disengaged arrangement 66; in such an embodiment, although the biasing members 60 are not actively configured to retract or disengage from the payload chamber 27, they may nonetheless passively permit the rotatable conveying members 41 to move outward when a payload 19 is loaded into the payload chamber 27.

In addition to a magazine 21 and a conveying mechanism 40, the system 20 may further include a pivoting mechanism 35 connected with the magazine 21 and configured for connection with the aircraft 10. The pivoting mechanism 35 may be configured for pivoting the magazine 21 about the second end 24 between the stowed orientation 38 (FIGS. 1-2) and the deployed orientation 39 (FIG. 3).

As shown schematically in FIGS. 1-2, the pivoting mechanism 35 may have a first axis 36 which is generally parallel with both the longitudinal magazine axis 25 and the longitudinal airframe axis 12 when the magazine 21 is disposed in the stowed orientation 38, and a second axis 37 that is perpendicular to the first axis 36. Then, when the magazine 21 is rotated about its second end 24 as shown schematically in FIG. 3, the first end 23 extends outside the outer skin surface 17 and the second end 24 remains at or below the outer skin surface 17—thus permitting launch of one or more payloads 19 from the magazine 21 in an aftward direction 13—and the first axis 36 and the longitudinal magazine axis 25 each form an angle of inclination θ with respect to a longitudinal aircraft axis 12. In some embodiments, the pivoting mechanism 35 may be configured such that the angle of inclination θ may be less than 20 degrees, and optionally the angle of inclination θ may be greater than or equal to 10 degrees and less than or equal to 12 degrees.

Figure 16:
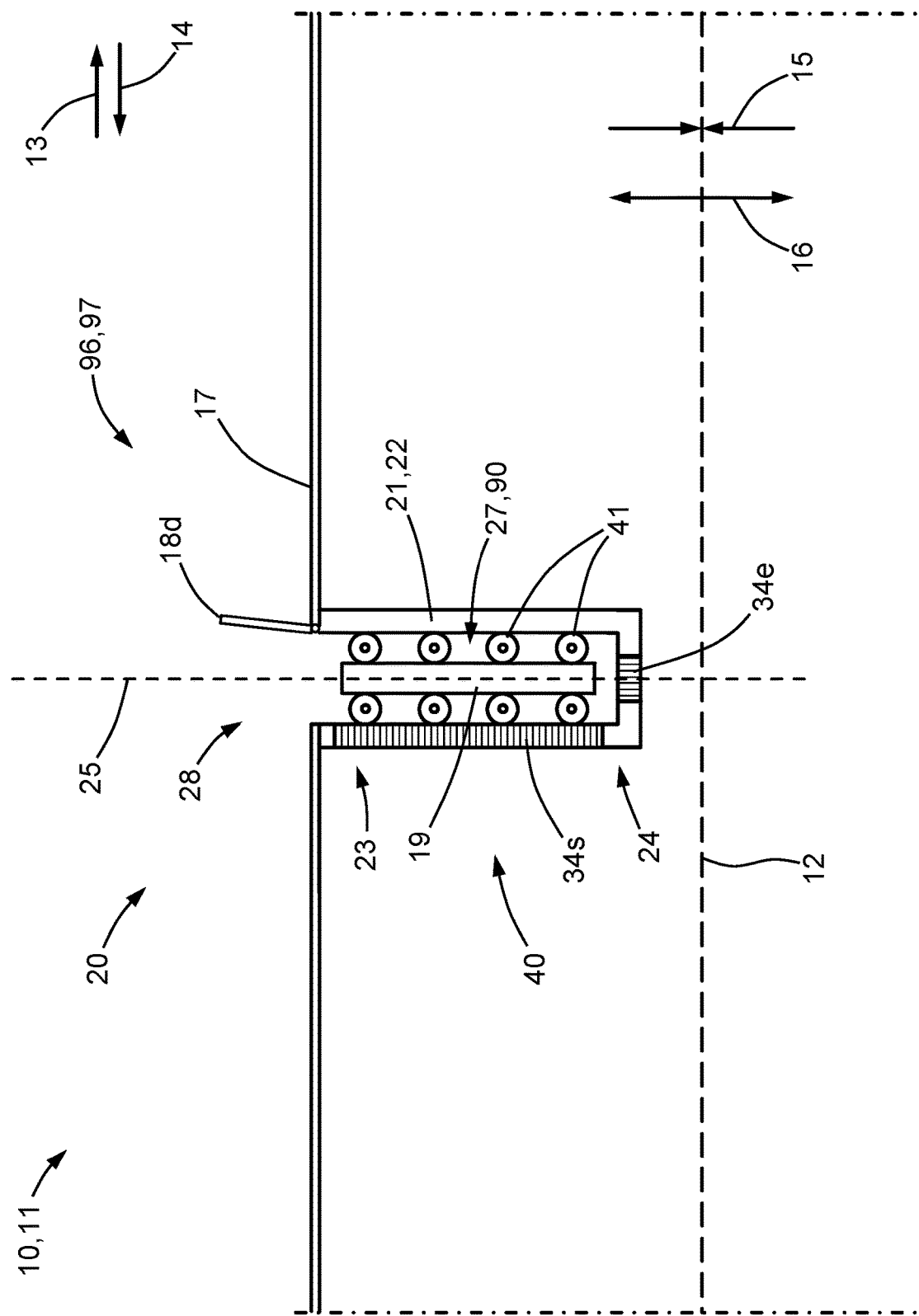
FIG. 16 is a schematic side view of a portion of an aircraft carrying a launching system in which the magazine is disposed generally perpendicular to a longitudinal axis of the aircraft.

FIG. 16 shows a schematic side view of an alternative embodiment for the launching system 20. Whereas the embodiment shown in FIGS. 1-3 may be considered as being in a "pivotable" configuration 92 as well as a "multiple payload" configuration 94, the embodiment shown in FIG. 16 may be considered as being in a "fixed" configuration 96 as well as a "single payload" configuration 97. In this embodiment, the magazine 21 is disposed generally perpendicular to the longitudinal axis 12 of the aircraft 10, and the system 20 does not include a pivoting mechanism 35. Here, the system 20 includes a magazine 21 and a conveying mechanism 40, with the magazine 21 and main structure 22 having opposed first and second ends 23, 24, a longitudinal magazine axis 25 extending between the first and second ends 23, 24, a payload chamber 27 for retaining the payload 19 therein, and an exit port 28 at the first end 23 through which the payload 19 may be launched from the magazine 21.

As with the embodiment shown in FIGS. 1-3, the system 20 shown in FIG. 16 is arranged such that the magazine 21 is configured to be disposed at or below an outer skin surface 17 of the aircraft 10, and the conveying mechanism 40 is operatively associated with the magazine 21 and includes a rotatable conveying member 41 configured for contacting an outer surface 19os of the payload 19 when the payload 19 is loaded into the payload chamber 27, and for selectably rotating at a predetermined rate 57 so as to cause the payload 19 to be launched out of the magazine 21 through the exit port 28, which may be selectably covered and uncovered by an outer skin door 18d. The embodiment shown in FIG. 16 may include an end loading door or passage 34e at the second end 24, and/or a side loading door or passage 34s along the side of the main structure 22, through which the payload 19 may be loaded into the payload chamber 27 and in the ready-to-launch position 90.

Figure 17:
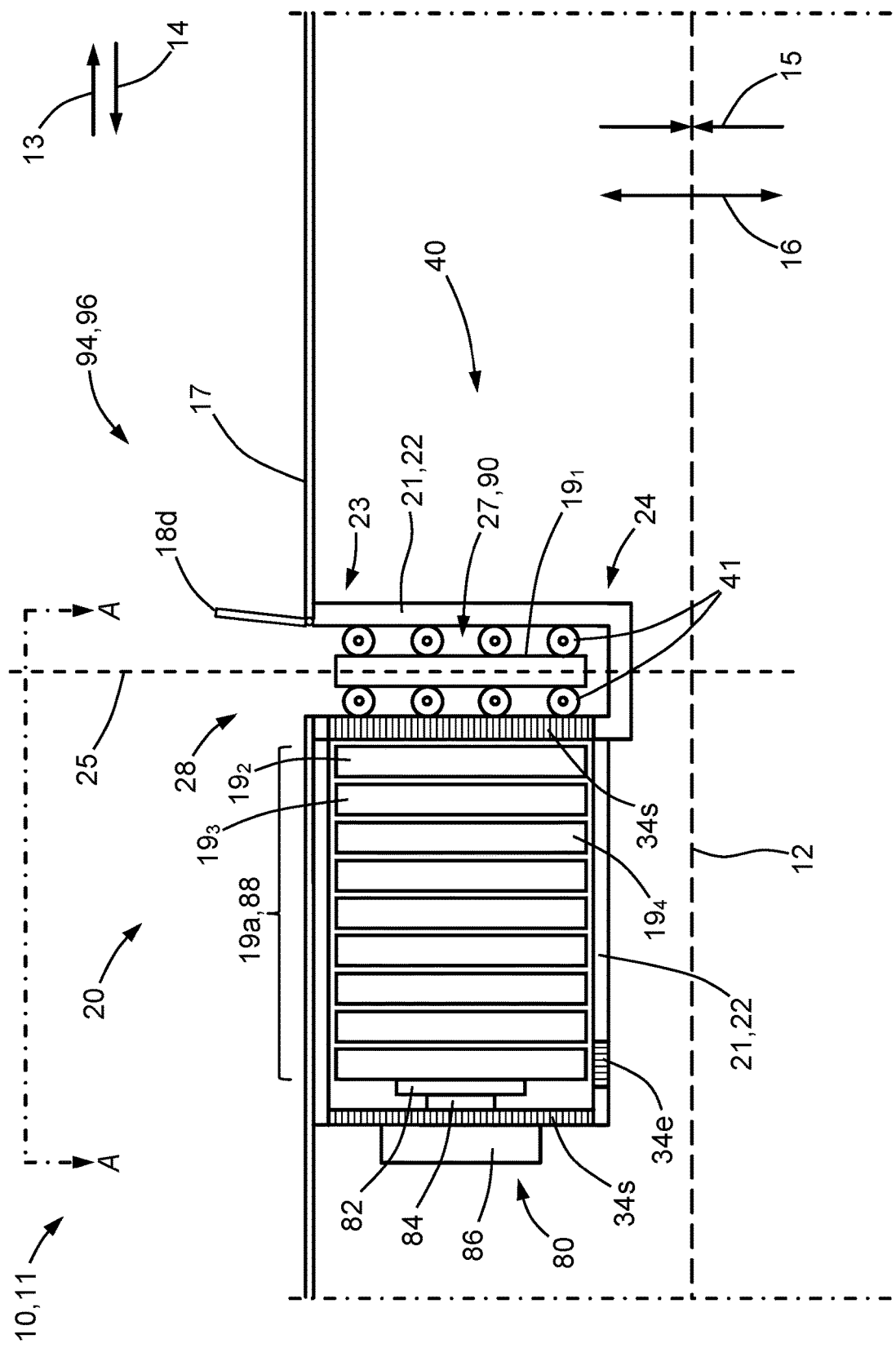
FIG. 17 is a schematic side view of a portion of an aircraft carrying a launching system similar to that shown in FIG. 16, but configured for carrying multiple payloads.

FIG. 17 shows a schematic side view of a launching system 20 similar to the "fixed" configuration 96 shown in FIG. 16, but configured for carrying multiple payloads 19 in a "multiple payload" configuration 94. Here, some of the payloads 19 have subscripts added indicating a first payload $19_1$ loaded into the ready-to-launch position 90, and additional payloads 19a—i.e., second, third and fourth payloads $19_2$, $19_3$, $19_4$—loaded into standby positions 88. The portion of the magazine 21 housing the standby positions 88 has an end loading door/passage 34c and a side loading door/passage 34s through which payloads 19, 19a may be loaded, and the portion of the main structure 22 of the magazine 21 separating the ready-to-launch position 90 from the standby positions 88 also has a side loading door/passage 34s through which the next additional payload 19a may be advanced (i.e., from a standby position 88 to the ready-to-launch position 90, after a payload 19 has been launched and/or when the payload chamber 27 in the ready-to-launch position 90 is empty). Such advancing of payloads 19, 19a may be assisted by an advancing mechanism 80, as described in detail below.

Figure 18:
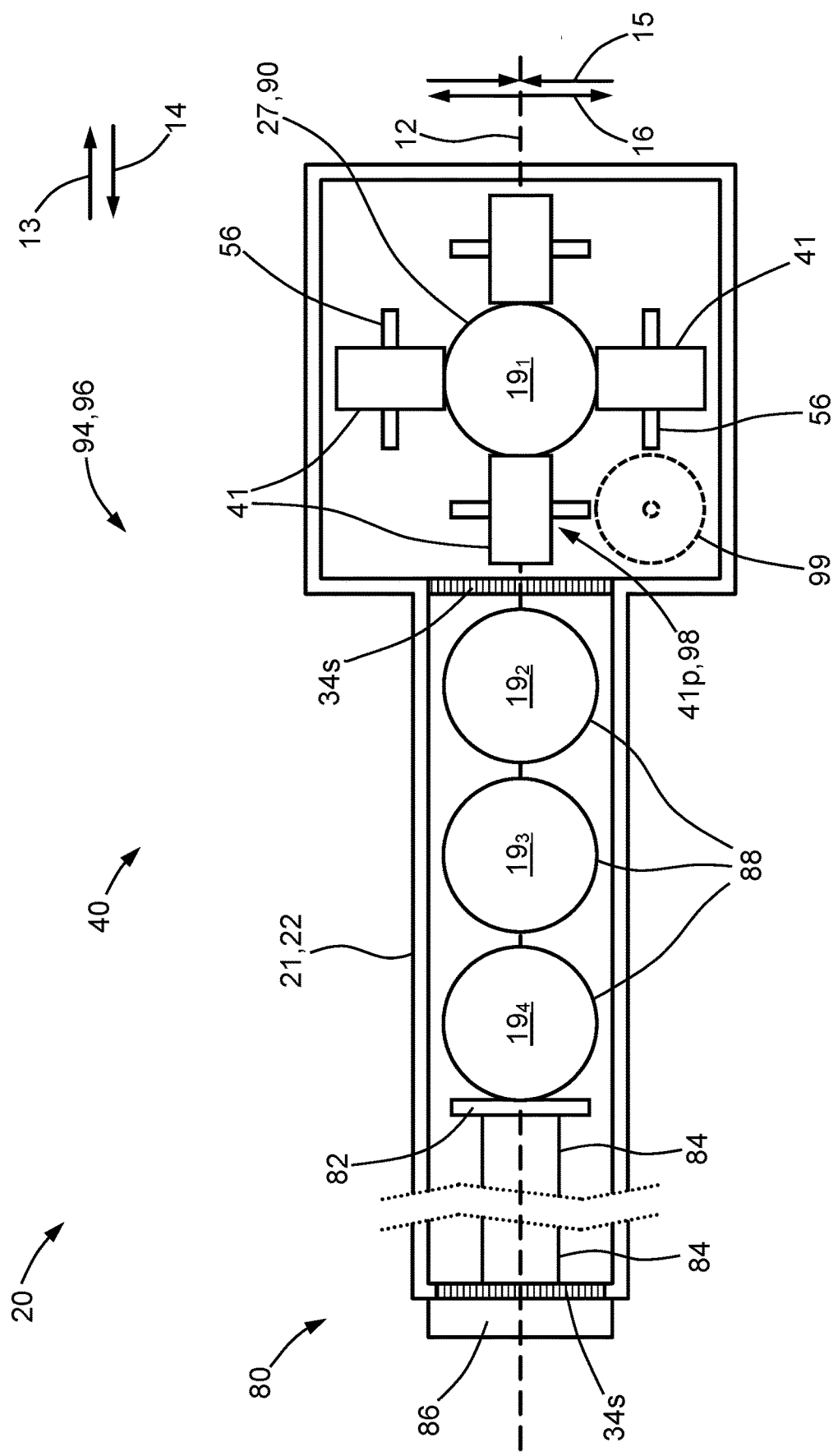
FIGS. 18-19 are schematic top views of the launching system of FIG. 17 as viewed along line A-A, showing a pivotable rotatable conveying member in engaged and disengaged orientations, respectively.
Figure 19:
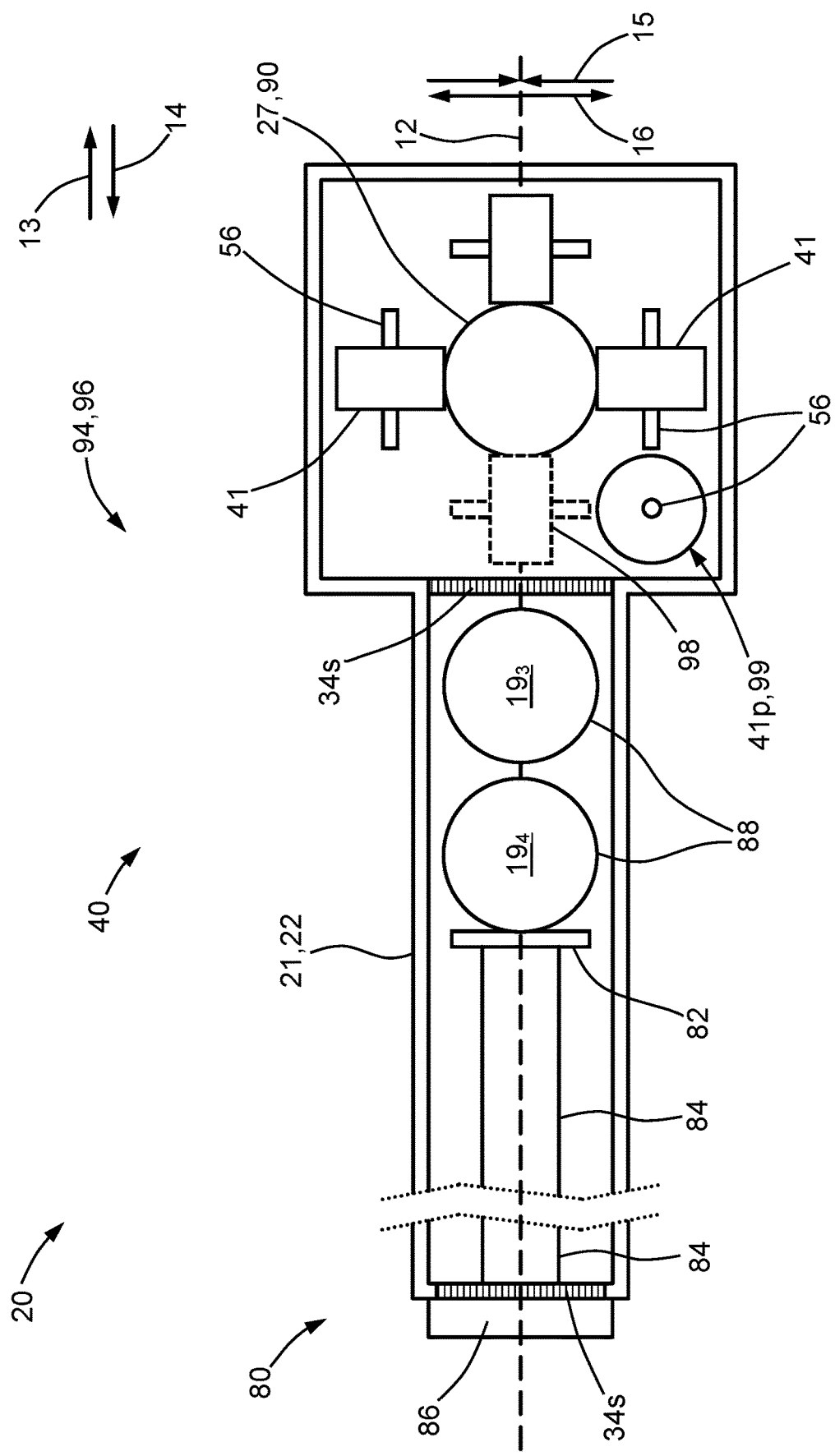

FIGS. 18-19 show schematic top views of the launching system 20 of FIG. 17 as viewed along line A-A, showing a pivotable rotatable conveying member 41p in engaged and disengaged orientations 98, 99, respectively. In FIG. 18, a first payload 19$_1$ is shown loaded into the ready-to-launch position 90 with four rotatable conveying members 41 engaging the first payload 19$_1$, with one of the rotatable conveying members 41 being a pivotable rotatable conveying member 41p. Second, third and fourth payloads 19$_2$, 19$_3$, 19$_4$ are shown in the three standby positions 88 immediately adjacent to the ready-to-launch position 90, with an advancing mechanism 80 assisting in holding these additional payloads 19$_2$, 19$_3$, 19$_4$ in place. Here, the pivotable rotatable conveying member 41p is shown in the engaged orientation 98—i.e., with the pivotable rotatable conveying member 41p being engaged with the first payload 19$_1$.

Once the first payload 19$_1$ is launched by the conveying mechanism 40 (i.e., by the rotation of the four rotatable conveying members 41), the pivotable rotatable conveying member 41p may be pivoted to the disengaged orientation 99, as shown in FIG. 19, and the advancing mechanism 80 may advance the second, third and fourth payloads 19$_2$, 19$_3$, 19$_4$ such that the second payload 19$_2$ is positioned into the ready-to-launch position 90. Once the second payload 19$_2$ is in the ready-to-launch position 90, the pivotable rotatable conveying member 41p may be pivoted back into the engaged position 98, so that all four rotatable conveying members 41 are engaged with the second payload 19$_2$.

As noted above and as illustrated in FIGS. 1-3 and 17-19, the magazine 21 may be configured for retaining one or more additional payloads 19a therein in a multiple payload configuration 94. In this configuration, the magazine 21 may include an advancing mechanism 80 for advancing the additional payloads 19a from a standby position 88, in which the additional payload 19a is located outside the payload chamber 27, to a ready position 90, in which the additional payload 19a is loaded into the payload chamber 27. The advancing mechanism 80 may include a platen, platform or cradle portion 82 for engaging with a payload's outer surface 19os, a riser or ram portion 84 for moving and positioning the platen portion 82, and a power portion 86 for moving and positioning the riser portion 84. Note that in some configurations, the advancing mechanism 80 may also be configured to advance a single payload 19, rather than multiple payloads 19, 19a, such as in a system 20 that is configured in a single payload configuration 97. The advancing mechanism 80 may also assist in moving payloads 19, 19a from one barrel to another, such as shown in the configuration of FIGS. 1-3 in which the advancing mechanism 80 may assist in transferring payloads 19, 19a from the second barrel 32 to the first barrel 31.

Figure 20:
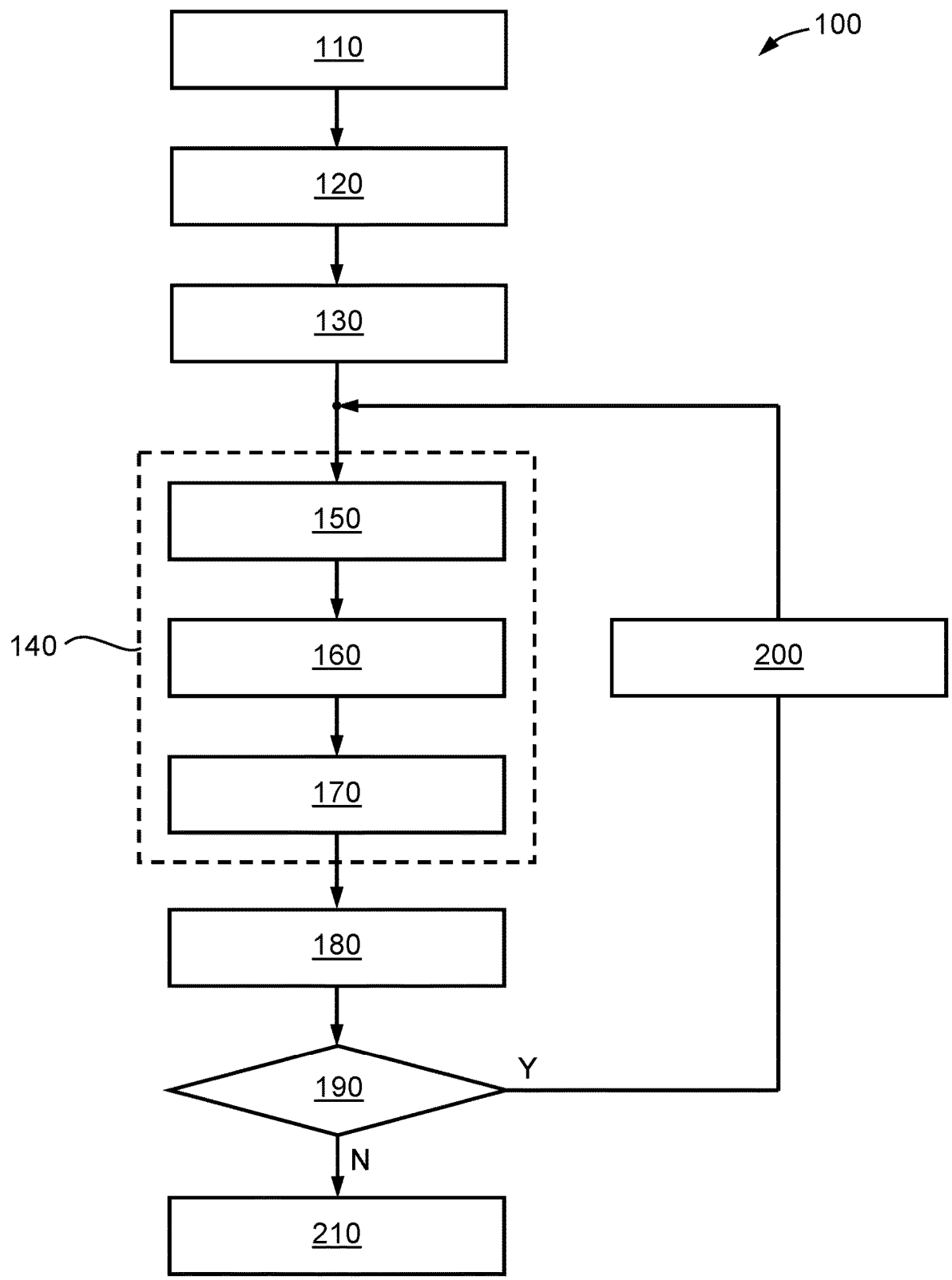
FIG. 20 is a flowchart of a method for launching a payload from an aircraft.

FIG. 20 shows a flowchart of steps for a method 100 for launching a payload 19 from an aircraft 10. The method 100 includes, at block 120, loading the payload 19 into a payload chamber 27 of a magazine 21, wherein the magazine 21 has opposed first and second ends 23, 24, a longitudinal magazine axis 25 extending between the first and second ends 23, 24, the payload chamber 27 located proximate the first end 23, and an exit port 28 at the first end 23 through which the payload 19 may exit the magazine 21, wherein the magazine 21 is configured to be disposed at or below an outer skin surface 17 of the aircraft 10. The method 100 also includes, at block 140, rotating a rotatable conveying member 41 at a predetermined rate 57 with the rotatable conveying member 41 being in contact with an outer surface 19os of the payload 19, so as to cause the payload 19 to be launched out of the magazine 21 through the exit port 28.

As shown in FIG. 20, block 140 may optionally comprise blocks 150, 160 and 170. In block 150, a rotatable conveying member 41 is retracted; in block 160, the rotatable conveying member 41 is rotated about its axis 41a with the rotatable conveying member 41 being disengaged from payload outer surface 19os; and in block 170, the rotatable conveying member 41 is engaged with the payload outer surface 19os while the rotatable conveying member 41 is rotating.

The method 100 may optionally also include, at block 110, providing a system 20 for launching which includes the magazine 21, the payload chamber 27, the exit port 28 and the rotatable conveying member 41. Additionally, the method 100 may optionally also include: at block 130, pivoting the magazine 21 from the stowed orientation 38 to the deployed orientation 39, and, at block 180, launching the payload 19 from the magazine 21. At block 190, a determination is made as to whether another payload 19 is to be launched; if the answer is "yes", then the process flow proceeds on to block 200, where the next payload 19 (e.g., an additional payload 19a) is advanced into the ready-to-launch position 90; but, if the answer is "no", then the process flow proceeds on to block 210, where the magazine 21 is pivoted from the deployed orientation 39 to the stowed orientation 38.

Figure 15:
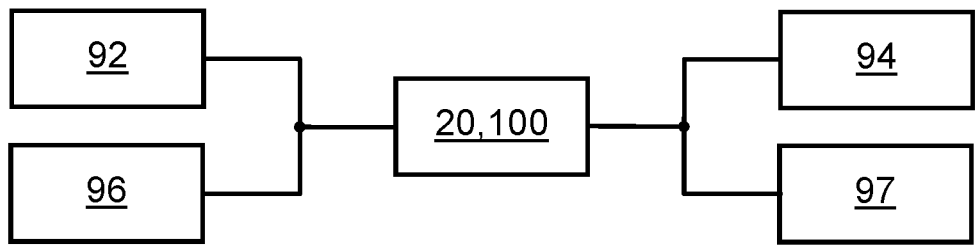
FIG. 15 is a block diagram illustrating various possible embodiments for a system and method according to the present disclosure.

In FIG. 15, a block diagram is shown illustrating various embodiments for a system 20 and method 100 according to the present disclosure. As illustrated by the block diagram, each embodiment may incorporate a pivotable configuration 92 or a fixed configuration 96, as well as a multiple payload configuration 94 or a single payload configuration 97. Thus, four different embodiments are possible: (i) a first embodiment incorporating pivotable and multiple payload configurations 92, 94 (e.g., FIGS. 1-3); (ii) a second embodiment incorporating pivotable and single payload configurations 92, 97; (iii) a third embodiment incorporating fixed and multiple payload configurations 96, 94 (e.g., FIGS. 17-19); and (iv) a fourth embodiment incorporating fixed and single payload configurations 96, 97 (e.g., FIG. 16).

As one having skill in the relevant art will appreciate, the system 20 and method 100 of the present disclosure may be presented or arranged in a variety of different configurations and embodiments.

According to one embodiment, a system 20 for launching a payload 19 from an aircraft 10 includes a magazine 21 and a conveying mechanism 40. The magazine 21 has opposed first and second ends 23, 24, a longitudinal magazine axis 25 extending between the first and second ends 23, 24, a payload chamber 27 proximate the first end 23 for retaining the payload 19 therein, and an exit port 28 at the first end 23 through which the payload 19 may exit the magazine 21, wherein the magazine 21 is configured to be disposed at or below an outer skin surface 17 of the aircraft 10. The conveying mechanism 40 is operatively associated with the magazine 21 and includes a rotatable conveying member 41 configured for contacting an outer surface 19os of the payload 19 when the payload 19 is loaded into the payload chamber 27 and for selectably rotating at a predetermined rate 57 so as to cause the payload 19 to be launched out of the magazine 21 through the exit port 28.

The system 20 may also include a pivoting mechanism 35 connected with the magazine 21 and configured for connection with the aircraft 10. The pivoting mechanism 35 may be configured for pivoting the magazine 21 about the second end 24 between a stowed orientation 38, in which the first end 23 is disposed at or below an outer skin surface 17 of the aircraft 10, and a deployed orientation 39, in which the first end 23 extends outside the outer skin surface 17 and the second end 24 remains at or below the outer skin surface 17 with the longitudinal magazine axis 25 forming an angle of inclination θ with respect to a longitudinal axis 12 of the aircraft 10. In this arrangement, the angle of inclination θ may be less than 20 degrees, and optionally the angle of inclination θ may be greater than or equal to 10 degrees and less than or equal to 12 degrees.

The magazine 21 may have a generally tubular shape 19t, and the payload 19 may have a straight extrusion-like overall shape 19s. Optionally, the magazine 21 may include one or more guiding members 70 therein for supporting the payload 19 when the payload 19 is loaded into the payload chamber 27.

The rotatable conveying member 41 may be configured as a wheel 46, a generally cylindrical roller 48, a spool 50 or a continuous belt 52, and it may have an outer traction surface 53 made of an elastomeric material 55. In some configurations, the rotatable conveying member 41 may include at least two rotatable conveying members 41 disposed about a cross-sectional perimeter 42 of the payload chamber 27.

The conveying mechanism 40 may include a biasing member 60 configured to bias the rotatable conveying member 41 against the outer surface 19os of the payload 19 when the payload 19 is loaded into the payload chamber 27. Additionally, the conveying mechanism 40 may be located proximate the first end 23 of the magazine 21. In some arrangements, the conveying mechanism 40 may be further configured for rotating the rotatable conveying member 41 with the rotatable conveying member 41 disengaged from the outer surface 19os of the payload 19, and for engaging the rotatable conveying member 41 with the outer surface 19os of the payload 19 while the rotatable conveying member 41 is rotating.

The magazine 21 may be configured for retaining an additional payload 19a therein. In this configuration, the magazine 21 may include an advancing mechanism 80 for advancing the additional payload 19a from a standby position 88, in which the additional payload 19a is located outside the payload chamber 27, to a ready position 90, in which the additional payload 19a is loaded into the payload chamber 27.

The predetermined rate 57 of rotation of the rotatable conveying member 41 may be a predetermined rotational speed 58 and/or a predetermined torque 59.

According to another embodiment, a system 20 for launching a payload 19 from an aircraft 10 in an aftward direction 14 during flight includes: (i) a generally tubular-shaped magazine 21 having opposed first and second ends 23, 24, a longitudinal magazine axis 25 extending between the first and second ends 23, 24, a payload chamber 27 proximate the first end 23 for retaining the payload 19 therein, and an exit port 28 at the first end 23 through which the payload 19 may exit the magazine 21; (ii) a pivoting mechanism 35 connected with the magazine 21 and configured for connection with the aircraft 10, wherein the pivoting mechanism 35 is configured for pivoting the magazine 21 about the second end 24 between a stowed orientation 38, in which the first end 23 is disposed at or below an outer skin surface 17 of the aircraft 10, and a deployed orientation 39, in which the first end 23 extends outside the outer skin surface 17 and the second end 24 remains at or below the outer skin surface 17 with the longitudinal magazine axis 25 forming an angle of inclination θ of less than 20 degrees with respect to a longitudinal axis 12 of the aircraft 10; and (iii) a conveying mechanism 40 connected with the magazine 21 and including a rotatable conveying member 41 configured for contacting an outer surface 19os of the payload 19 when the payload 19 is loaded into the payload chamber 27 and for selectably rotating about an axis of rotation 41a at a predetermined rate 57 when the magazine 21 is in the deployed orientation 39 so as to cause the payload 19 to be launched out of the magazine 21 through the exit port 28.

According to yet another embodiment, a method 100 for launching a payload 19 from an aircraft 10 includes: (i) at block 120, loading the payload 19 into a payload chamber 27 of a magazine 21, wherein the magazine 21 has opposed first and second ends 23, 24, a longitudinal magazine axis 25 extending between the first and second ends 23, 24, the payload chamber 27 located proximate the first end 23, and an exit port 28 at the first end 23 through which the payload 19 may exit the magazine 21, wherein the magazine 21 is configured to be disposed at or below an outer skin surface 17 of the aircraft 10; and (ii) at block 140, rotating a rotatable conveying member 41 at a predetermined rate 57 with the rotatable conveying member 41 being in contact with an outer surface 19os of the payload 19 so as to cause the payload 19 to be launched out of the magazine 21 through the exit port 28.

The method 100 may also include, at block 130, pivoting the magazine 21 from a stowed orientation 38, in which the first end 23 is disposed at or below an outer skin surface 17 of the aircraft 10, to a deployed orientation 39, in which the first end 23 extends outside the outer skin surface 17 and the second end 24 remains at or below the outer skin surface 17. Additionally, the magazine 21 may be configured for retaining at least one additional payload 19a therein, and the method 100 may further include, at block 200, advancing one of the at least one additional payload 19a from a standby position 88, in which the one of the at least one additional payload 19a is located outside the payload chamber 27, to a ready position 90, in which the one of the at least one additional payload 19a is loaded into the payload chamber 27.

While various steps of the method 100 have been described as being separate blocks, and various functions of the system 20 have been described as being separate modules or elements, it may be noted that two or more steps may be combined into fewer blocks, and two or more functions may be combined into fewer modules or elements. Similarly, some steps described as a single block may be separated into two or more blocks, and some functions described as a single module or element may be separated into two or more modules or elements. Additionally, the order of the steps or blocks described herein may be rearranged in one or more different orders, and the arrangement of the functions, modules and elements may be rearranged into one or more different arrangements.

(As used herein, a "module" may include hardware and/or software, including executable instructions, for receiving one or more inputs, processing the one or more inputs, and providing one or more corresponding outputs. Also note that at some points throughout the present disclosure, reference may be made to a singular input, output, element, etc., while at other points reference may be made to plural/multiple inputs, outputs, elements, etc. Thus, weight should not be given to whether the input(s), output(s), element(s), etc. are used in the singular or plural form at any particular point in the present disclosure, as the singular and plural uses of such words should be viewed as being interchangeable, unless the specific context dictates otherwise.)

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A system to launch a payload from an aircraft, the system comprising:
   a magazine having opposed first and second ends, a payload chamber to retain the payload, and an exit port at the first end through which the payload is launched from the magazine;
   a rotatable conveying member to contact an outer surface of the payload and cause the payload to launch out of the magazine through the exit port; and
   a pivot structure connected to the magazine and the aircraft, the pivot structure to pivot the magazine about the second end between a stowed orientation and a deployed orientation, the stowed orientation to position the first end internal to an outer skin surface of the aircraft, and the deployed orientation to position the first end outside the outer skin surface and position the second end internal to the outer skin surface.

2. The system of claim 1, wherein, in the deployed orientation, a longitudinal magazine axis extending between the first and second ends forms an angle of inclination with respect to a longitudinal axis of the aircraft.

3. The system of claim 2, wherein the angle of inclination is less than 20 degrees.

4. The system of claim 2, wherein the angle of inclination is greater than or equal to 10 degrees and less than or equal to 12 degrees.

5. The system of claim 1, wherein the magazine has a tubular shape.

6. The system of claim 1, wherein the rotatable conveying member is at least one of a wheel, a cylindrical roller, a spool or a continuous belt.

7. The system of claim 1, wherein the rotatable conveying member has an outer traction surface made of an elastomeric material.

8. The system of claim 1, wherein the payload has a straight shape.

9. The system of claim 1, including a biasing structure to bias the rotatable conveying member against the outer surface of the payload when the payload is loaded into the payload chamber.

10. The system of claim 1, wherein the rotatable conveying member and at least a second rotatable conveying member are disposed about a cross-sectional perimeter of the payload chamber.

11. The system of claim 1, wherein the rotatable conveying member is located proximate the first end of the magazine.

12. The system of claim 1, wherein the magazine includes one or more guiding members to support the payload when the payload is loaded into the payload chamber.

13. The system of claim 1, wherein the magazine is to retain an additional payload.

14. The system of claim 13, wherein the magazine includes an advancing mechanism to advance the additional payload from a standby position, in which the additional payload is located outside the payload chamber, to a ready position, in which the additional payload is loaded into the payload chamber.

15. The system of claim 1, wherein the rotatable conveying member is to rotate at a predetermined rotational speed and/or a predetermined torque.

16. The system of claim 1, wherein:
   the rotatable conveying member is to rotate with the rotatable conveying member disengaged from the outer surface of the payload; and
   the rotatable conveying member is to engage the outer surface of the payload while the rotatable conveying member is rotating.

17. A system to launch a payload from an aircraft in an aftward direction during flight, the system comprising:
   a tubular-shaped magazine having opposed first and second ends, a payload chamber proximate the first end, and an exit port at the first end through which the payload is launched from the magazine;
   a pivot structure connected to the magazine proximate the second end, the magazine to rotate about the pivot structure between a stowed orientation and a deployed orientation, the stowed orientation to position the first end internal to an outer skin surface of the aircraft, the deployed orientation to position the first end outside the outer skin surface and position the second end below internal to the outer skin surface; and
   a rotatable conveying member to rotate about an axis of rotation when the magazine is in the deployed orientation and to cause the payload to launch out of the magazine through the exit port.

18. A method to launch a payload from an aircraft, the method comprising:
   loading the payload into a payload chamber of a magazine, wherein the magazine has opposed first and second ends and an exit port at the first end through which the payload is launched from the magazine;
   pivoting the magazine about the second end from a stowed orientation to a deployed orientation, the stowed orientation to position the first end at or internal to an outer skin surface of the aircraft, the deployed orientation to position the first end outside the outer skin surface and position the second end at or internal to the outer skin surface; and rotating a rotatable conveying member that is in contact with an outer surface of the payload to cause the payload to launch out of the magazine through the exit port.

19. The method of claim 18, wherein the magazine is configured to retain an additional payload, the method further comprising:

advancing the additional payload from a standby position, in which the additional payload is located outside the payload chamber, to a ready position, in which the additional payload is loaded into the payload chamber.

20. The system of claim 17, including a biasing structure to bias the rotatable conveying member against an outer surface of the payload when the payload is loaded into the payload chamber.

* * * * *

UNITED STATES PATENT AND TRADEMARK OFFICE
CERTIFICATE OF CORRECTION

PATENT NO. : 12,296,957 B2
APPLICATION NO. : 18/333064
DATED : May 13, 2025
INVENTOR(S) : Norman Allen Tolentino Page 1 of 1

It is certified that error appears in the above-identified patent and that said Letters Patent is hereby corrected as shown below:

In the Claims

Column 14, Line 51 Claim 17 delete "below".

Signed and Sealed this
Seventeenth Day of June, 2025

Coke Morgan Stewart
*Acting Director of the United States Patent and Trademark Office*